US012694623B2

(12) United States Patent
Da Veiga et al.

(10) Patent No.: US 12,694,623 B2
(45) Date of Patent: Jul. 28, 2026

(54) 3D PHOTOS

(71) Applicant: APPLE INC., Cupertino, CA (US)

(72) Inventors: Alexandre Da Veiga, San Francisco,
CA (US); Jeffrey S. Norris, Saratoga,
CA (US); Madhurani R. Sapre,
Milpitas, CA (US); Spencer H. Ray,
San Jose, CA (US)

(73) Assignee: Apple Inc., Cupertino, CA (US)

( * ) Notice: Subject to any disclaimer, the term of this
patent is extended or adjusted under 35
U.S.C. 154(b) by 248 days.

(21) Appl. No.: 17/980,584

(22) Filed: Nov. 4, 2022

(65) Prior Publication Data

US 2023/0298278 A1     Sep. 21, 2023

Related U.S. Application Data

(63) Continuation    of    application    No.
PCT/US2021/028329, filed on Apr. 21, 2021.
(Continued)

(51) Int. Cl.
G06T 19/00       (2011.01)
G06T 5/73        (2024.01)
(Continued)

(52) U.S. Cl.
CPC .............. G06T 19/006 (2013.01); G06T 5/73
(2024.01); G06T 5/77 (2024.01); G06T 5/94
(2024.01);
(Continued)

(58) Field of Classification Search
CPC ....... G06T 19/006; G06T 15/60; G06T 15/08;
G06T 7/70; G06T 5/94; G06T 5/77;
G06T 5/73
See application file for complete search history.

(56) References Cited

U.S. PATENT DOCUMENTS 8,643,703 B1    2/2014   Karakotsios et al.
9,579,574 B2    2/2017   Barnett et al.
(Continued)

FOREIGN PATENT DOCUMENTS

CN       102737404 A    10/2012
WO      2019/067902 A1    4/2019
WO      2020/002115 A1    1/2020

OTHER PUBLICATIONS

European Patent Office (ISA/EP), International Search Report and
Written Opinion of the International Searching Authority, Interna-
tional Application No. PCT/US2021/028329, 11 pages, Jul. 9, 2021.
(Continued)

*Primary Examiner* — Michelle Chin
(74) *Attorney, Agent, or Firm* — Thompson Hine LLP

(57)            ABSTRACT

Various implementations disclosed herein include devices,
systems, and methods that determine how to present a
three-dimensional (3D) photo in an extended reality (XR)
environment (e.g., in 3D, 2D, blurry, or not at all) based on
viewing position of a user active in the XR environment
relative to a placement of the 3D photo in the XR environ-
ment. In some implementations, at an electronic device
having a processor, a 3D photo that is an incomplete 3D
representation created based on one or more images cap-
tured by an image capture device is obtained. In some
implementations, a viewing position of the electronic device
relative to a placement position of the 3D photo is deter-
mined, and a presentation mode for the 3D photo is deter-
mined based on the viewing position. In some implementa-
tions, the 3D photo is provided at the placement position
based on the presentation mode in the XR environment.

22 Claims, 10 Drawing Sheets

Related U.S. Application Data

(60) Provisional application No. 63/020,603, filed on May 6, 2020.

(51) Int. Cl.

| | | |
|---|---|---|
| *G06T 5/77* | (2024.01) |
| *G06T 5/94* | (2024.01) |
| *G06T 7/70* | (2017.01) |
| *G06T 15/08* | (2011.01) |
| *G06T 15/60* | (2006.01) |

(52) U.S. Cl.
CPC ................ *G06T 7/70* (2017.01); *G06T 15/08* (2013.01); *G06T 15/60* (2013.01)

(56) References Cited

U.S. PATENT DOCUMENTS

| | | | |
|---|---|---|---|
| 9,881,584 B2 | 1/2018 | Dakss et al. | |
| 2004/0239670 A1 | 12/2004 | Marks | |
| 2014/0204002 A1* | 7/2014 | Bennet | G06F 3/017 |
| | | | 345/7 |
| 2017/0256096 A1 | 9/2017 | Faaborg et al. | |
| 2018/0114372 A1* | 4/2018 | Nagy | G06T 19/20 |
| 2018/0144547 A1* | 5/2018 | Shakib | G06T 15/503 |
| 2018/0150989 A1 | 5/2018 | Mitsui et al. | |
| 2020/0082628 A1* | 3/2020 | Jones | G06T 19/006 |
| 2020/0098189 A1* | 3/2020 | Pavloff | G06T 19/006 |
| 2020/0234504 A1* | 7/2020 | Haddick | G09G 3/3233 |
| 2020/0383602 A1* | 12/2020 | Rapoport | A61G 11/00 |

OTHER PUBLICATIONS

China National Intellectual Property Administration, First Office Action issued in Chinese Patent Application No. 202180047873.6 dated Jan. 20, 2026 with English translation (23 pages).

Zhang, "3D Architectural Modeling from Multiple Images", A dissertation for master's degree, University of Science and Technology of China, completed in May 2015 with machine English translation (179 pages).

Zhao, et al., "Multiple-camera holographic system featuring efficient depth grids for representation of real 3D objects", Research Article, Applied Optics, Optical Society of America, vol. 58, No. 5, Feb. 10, 2019, pp. A242-A250 (Nine (9) pages).

* cited by examiner

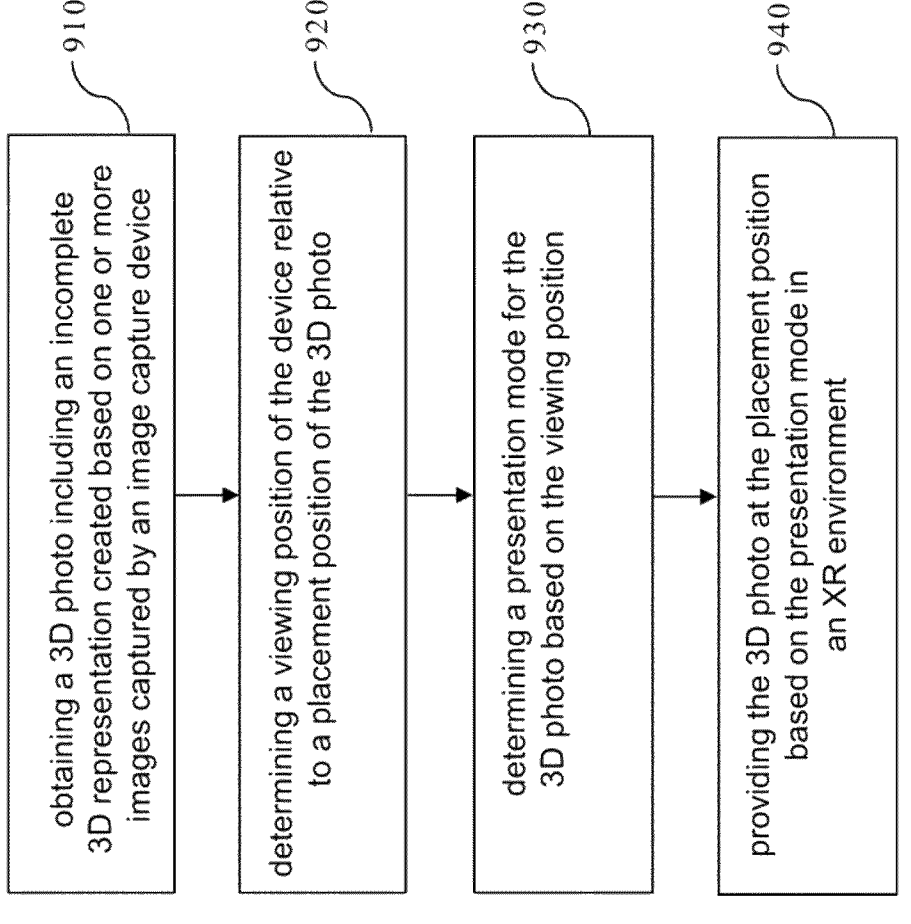

FIGURE 9

910 — obtaining a 3D photo including an incomplete 3D representation created based on one or more images captured by an image capture device 920 — determining a viewing position of the device relative to a placement position of the 3D photo 930 — determining a presentation mode for the 3D photo based on the viewing position 940 — providing the 3D photo at the placement position based on the presentation mode in an XR environment

3D PHOTOS

TECHNICAL FIELD

The present disclosure generally relates to systems, methods, and devices for providing or displaying photos and three-dimensional (3D) content.

BACKGROUND

Photos are typically two-dimensional (2D) representations of a physical environment captured from a single viewpoint. Such photos are typically printed or viewed on electronic devices in 2D without depth so that the viewpoint of the person holding the photo or device does not matter.

SUMMARY

Various implementations disclosed herein include devices, systems, and methods that enable creation and viewing of 3D photos that provide an incomplete 3D representation of a physical environment. The amount of viewable content represented by a 3D photo may depend upon the viewer's viewpoint, e.g., providing a complete view from a front viewpoint, a slightly incomplete view when viewed from a side angle, and a very incomplete view when viewed from a rear viewpoint. In some implementations, a 3D photo is presented in a extended reality (XR) environment based on the viewer's viewpoint in the XR environment relative to the 3D photo. For example, a 3D photo of a person captured with a camera facing that person may only have data for the front of the person and not the back of the person because the camera could not see the back of the person. In some implementations, 3D photos will look photo-realistic and 3D when viewed in a viewing area similar to the pose (e.g., position and orientation) or movement of an image capture device during creation of the 3D photo. For example, an average position of all image capture positions of an image capture device during creation of the 3D photo and a well-defined volume around the average capture position relative to the 3D photo may define a 3D viewing area (e.g., valid 3D viewing area) for the 3D photo based on the placement of the 3D photo in the XR environment.

In some implementations, mitigation techniques are user to modify a 3D depiction of the 3D photo in the XR environment based on a viewing position of a viewing electronic device in the XR environment relative to a placement position of the 3D photo in the XR environment. In some implementations, the display of the 3D photo is based on a viewing angle of a viewing electronic device relative to a placement (e.g., pose) of the 3D photo in the XR environment. In some implementations, the display of the 3D photo is based on a spatial distance from a viewing position of a viewing electronic device to the displayed 3D photo in the XR environment. In some implementations, the 3D photo is rendered in 3D when a viewpoint of a user is in a first viewing area (e.g., valid viewing area) and rendered as a 2D image or blurry when the user is outside the valid viewing area in the XR environment (e.g., to prevent the user from being able to view the missing portions of objects in the 3D photo). In some implementations, the 3D photo is depicted on or inside virtual objects in the XR environment. In some implementations, the 3D photo is depicted on or inside representations of physical objects in the XR environment.

In some implementations, only certain portions of the 3D photo are extracted (e.g., a 3D sub-volume or 3D cutout)

from the 3D photo for placement into the XR environment. In some implementations, just contextually relevant portions (e.g., a subject extracted from a fixed background) of the 3D photo are "cutout" and displayed in the XR environment. For example, when the 3D photo is of a person in an office with the desk and chairs, the furniture does not change during capture of images and data used to create the 3D photo, and instead a 3D cutout of the 3D photo that includes a 3D image of the person is extracted and placed in the XR environment.

Various implementations disclosed herein include devices, systems, and methods that determine how to present a 3D photo in an XR environment (e.g., in 3D, 2D, blurry, or not at all) based on viewing position of a user active in the XR environment relative to a placement of the 3D photo in the XR environment. In some implementations, at an electronic device having a processor, a 3D photo that is an incomplete 3D representation created based on one or more images captured by an image capture device is obtained. In some implementations, a viewing position of the electronic device relative to a placement position of the 3D photo is determined, and a presentation mode for the 3D photo is determined based on the viewing position. In some implementations, the 3D photo is provided at the placement position based on the presentation mode in the XR environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 9 is a flow-chart showing an exemplary method of detecting input to an XR environment by recognizing a handheld object and detecting a movement of the hand relative to the object according to some implementations.

Figure 1:
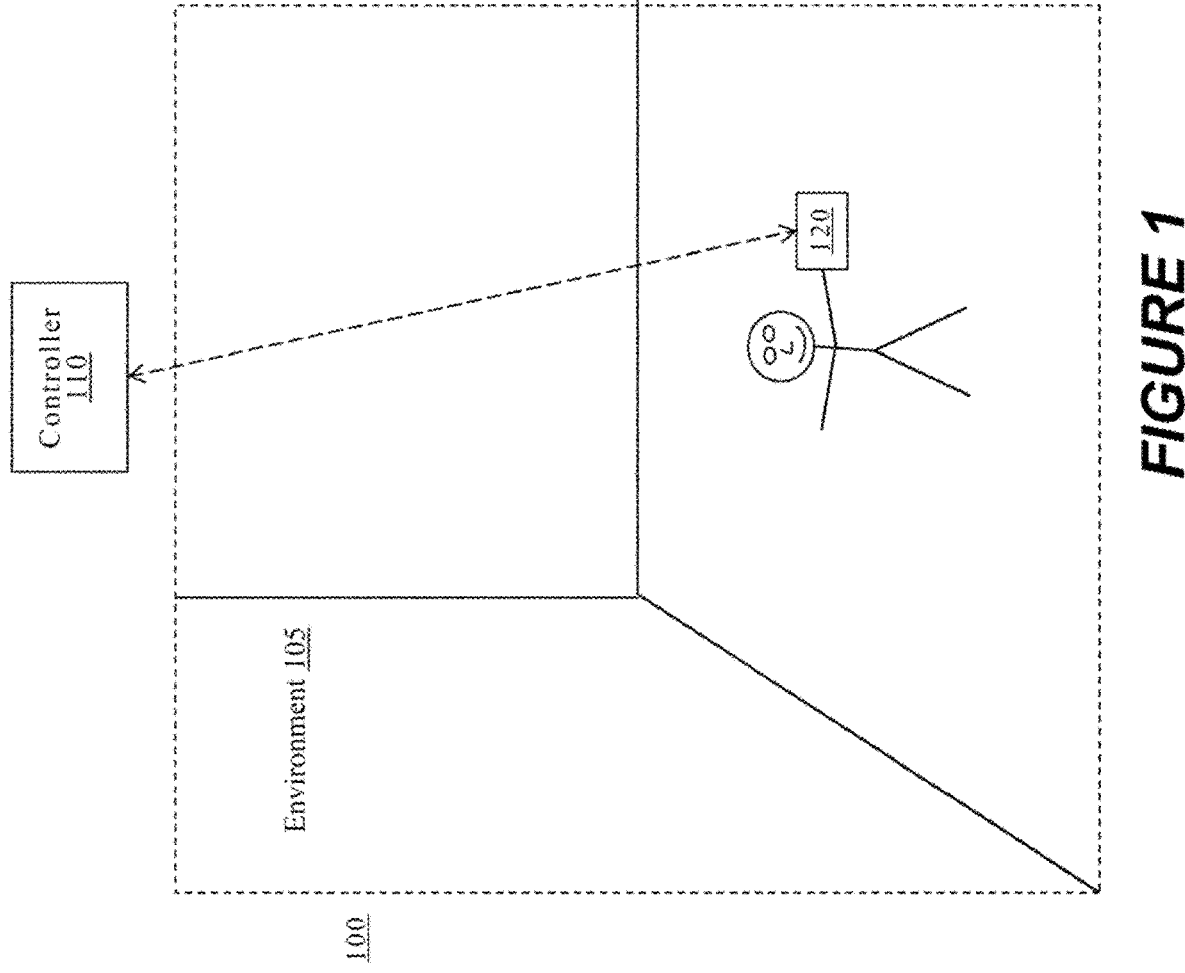
FIG. 1 is a block diagram showing an example system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
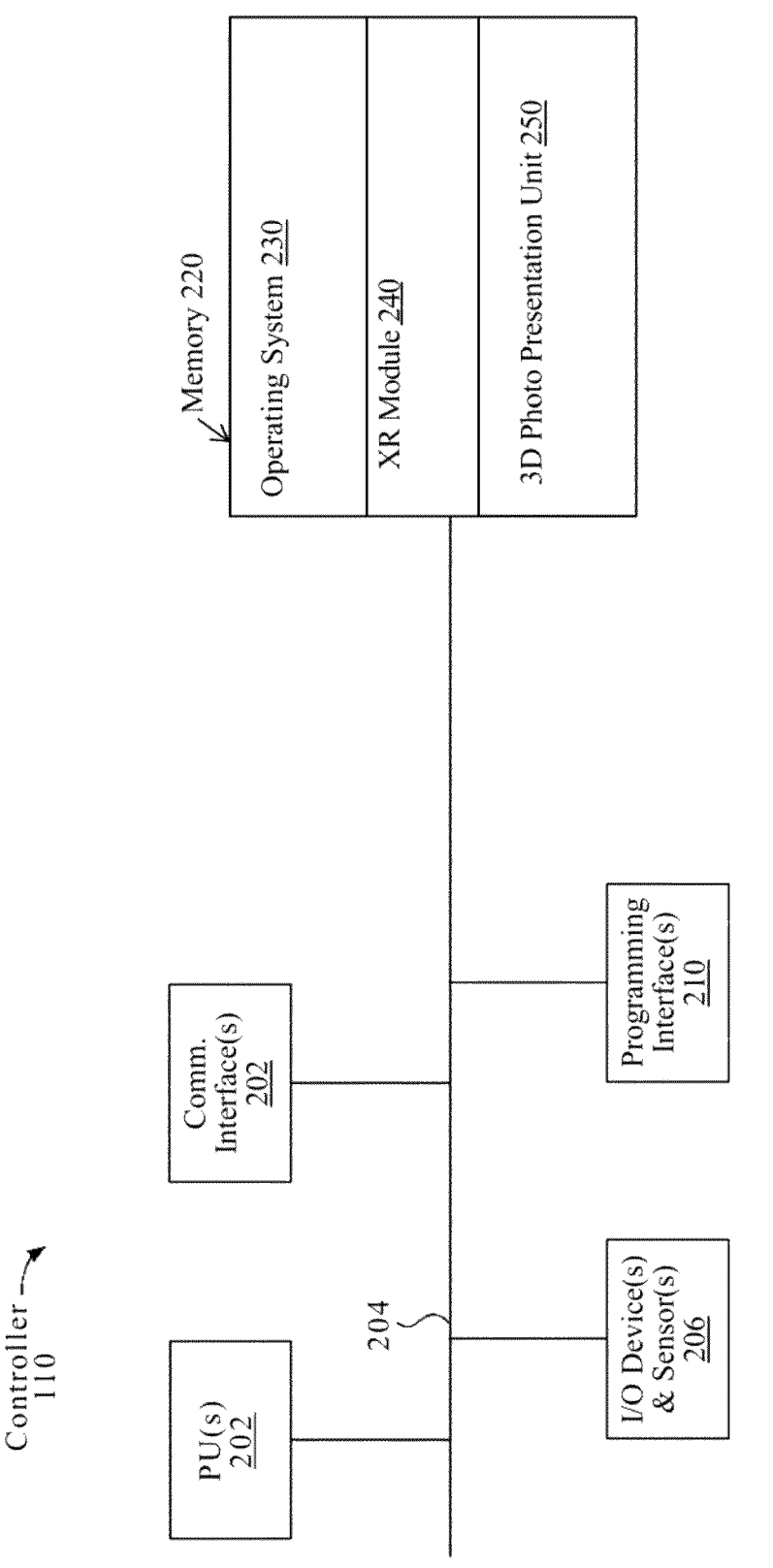
FIG. 2 is a block diagram showing an example controller, in accordance with some implementations.
Figure 3:
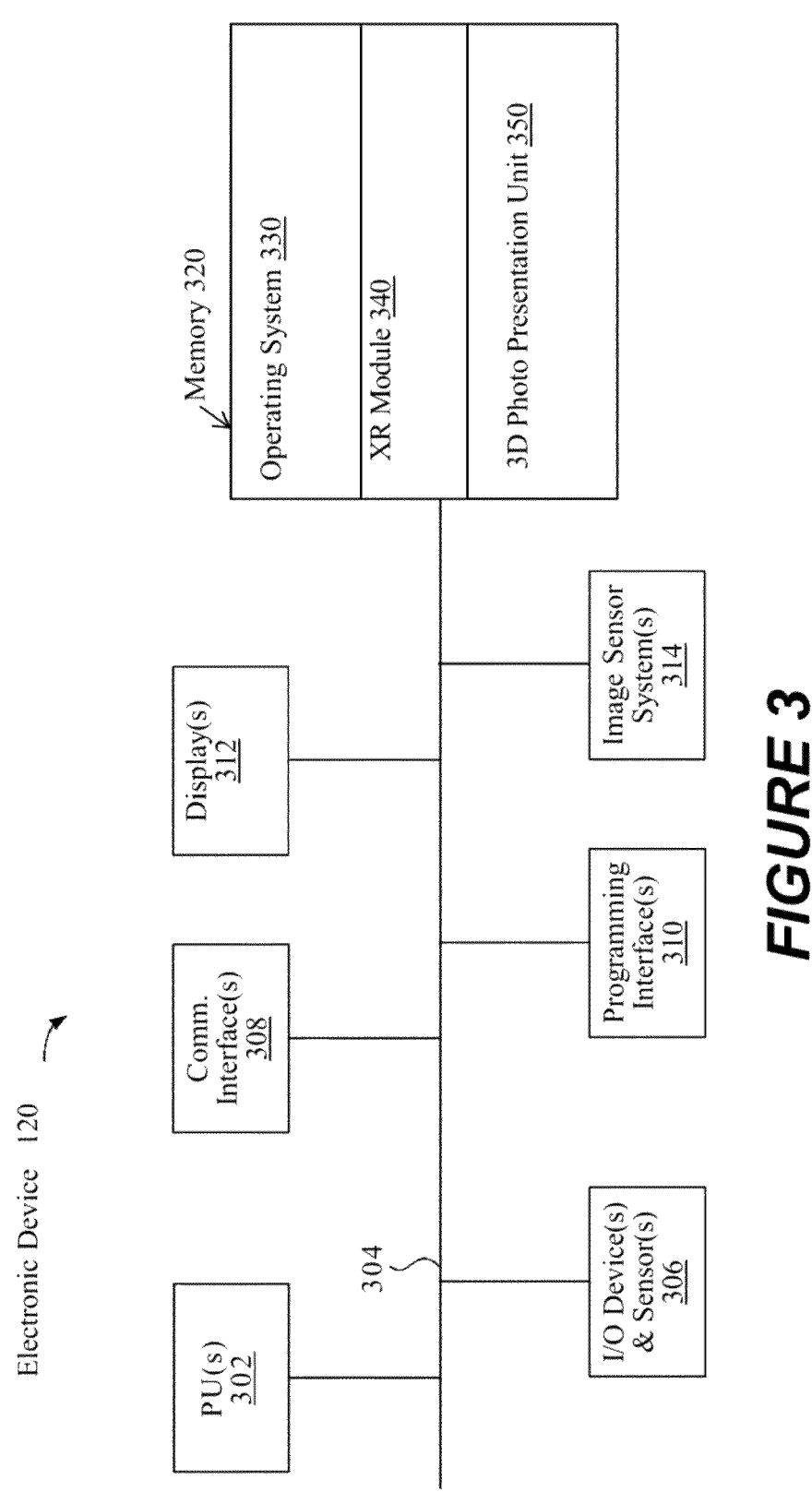
FIG. 3 is a block diagram showing an example electronic device, in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving electronic devices including, but not limited to, watches and other wearable electronic devices, mobile devices, laptops, desktops, HMDs, gaming devices, home automation devices, accessory devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device (e.g., laptop) 120, one or all of which may be in a physical environment 105. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate an extended reality reality (XR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with a corresponding electronic device 120 via one or more wired or wireless communication channels 144 (e.g., BLUETOOTH, IEEE 802.11x, IEEE 802.16x, IEEE 802.3x, etc.).

In some implementations, the controller 110 and a corresponding electronic device (e.g., 120) are configured to present the XR environment to the user together.

In some implementations, the electronic device 120 is configured to present the XR environment to the user. In some implementations, the electronic device 120 includes a suitable combination of software, firmware, or hardware. The electronic device 120 is described in greater detail below with respect to FIG. 3. In some implementations, the functionalities of the corresponding controller 110 is provided by or combined with the electronic device 120, for example, in the case of an electronic device that functions as a stand-alone unit.

According to some implementations, the electronic device 120 presents an XR environment to the user while the user is present within the physical environment 105. An extended reality (XR) environment refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

FIG. 2 is a block diagram of an example of a controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, extended reality (XR) module 240, and a 3D photo presentation unit 250.

The operating system 230 includes procedures for handling various basic system services and for performing hardware dependent tasks.

In some implementations, the XR module 240 is configured to create, edit, present, or experience XR environments. The XR module 240 is configured to present virtual content that will be used as part of XR environments for one or more users. For example, the user may view and otherwise experience an XR-based user interface that allows the user to select, place, move, and otherwise present an XR environment, for example, based on the virtual content location via hand gestures, voice commands, input device inputs, etc.

In some implementations, the 3D photo presentation unit 250 is configured to render 3D photos in an XR environment. In some implementations, the 3D photo presentation unit 250 is configured to determine a presentation mode for the 3D photo based on a viewing position relative to a placement position of the 3D photo in the XR environment. In some implementations, the 3D photo presentation unit 250 may be used to obtain or create 3D photos. Although these modules and units are shown as residing on a single device (e.g., the controller 110), it should be understood that in other implementations, any combination of these modules and units may be located in separate computing devices.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of an electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an XR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device may include a single display. In another example, the electronic device may include a display for each eye of the user.

In some implementations, the one or more interior or exterior facing sensor systems 314 include an image capture device or array that captures image data or an audio capture device or array (e.g., microphone) that captures audio data. In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light (e.g., upon a subject or a portion of the face of the user) such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, an extended reality (XR) module 340, and a 3D photo presentation unit 350.

The operating system 330 includes procedures for handling various basic system services and for performing hardware dependent tasks.

In some implementations, the XR module 340 is configured to create, edit, present, or experience XR environments. The XR module 340 is configured to present virtual content that will be used as part of XR environments for one or more users. For example, the user may view and otherwise experience an XR-based user interface that allows the user to select, place, move, and otherwise present an XR environment, for example, based on the virtual content location via hand gestures, voice commands, input device inputs, etc.

In some implementations, the 3D photo presentation unit 350 is configured to render 3D photos in an XR environment. In some implementations, the 3D photo presentation unit 350 is configured to determine a presentation mode for the 3D photo based on a viewing position relative to a placement position of the 3D photo in the XR environment. In some implementations, the 3D photo presentation unit 350 may be used to obtain or create 3D photos. Although these modules and units are shown as residing on a single device (e.g., the controller 110), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Various implementations disclosed herein include devices, systems, and methods that render 3D photos in an XR environment. In some implementations, examples of 3D photographs include parallax 3D photos, 1-to-1 scale 3D photos, multi-view 3D reconstruction photos including (i) 3D reconstructions using multiple different image sensors with overlapping images (e.g., wedding scenario) or (ii) multiple different overlapping images from a single image sensor, 3D panoramic photos, or the like. In some implementations, 3D photos are usually captured from a particular perspective and will lack data from other views. For example, a 3D photo of a person captured with a camera facing a person may only have data for the front of the person and not the back of the person because the camera could not see the back of the person. In some implementations, a viewing area where the 3D photo is viewable in 3D is determined by movement of an image capture device during creation of the 3D photo. For example, an average position of all image capture positions of the image capture device during creation of the 3D photo may define a valid viewing area (e.g., a well-defined 3D volume) for the 3D photo based on the placement of the 3D photo in the XR environment. In some implementations, a presentation mode (e.g., 3D, 2D, blurry, or not at all) for the 3D photo in the XR environment is based on the viewing position of a user's electronic device participating in the XR environment relative to a placement of the 3D photo in the XR environment. In some implementations, the presentation mode is determined by detecting the amount or percentage of valid pixels for the view of the 3D photo from the viewing position and comparing that against criteria or thresholds In some implementations, the 3D photo is an incomplete 3D representation because a significant amount of the views would be incomplete (e.g., missing data) from at least some viewpoints. In some implementations, a 3D photo is an incomplete 3D representation that has a plurality of viewing modes. In some implementations, the 3D photo is an incomplete 3D representation that has a first viewing mode (e.g., shown in 3D), a second viewing mode (e.g., shown in 2D or blurry), and a third viewing mode (e.g., not shown at all) in an XR environment based on the placement of the 3D photo in the XR environment relative to a viewing electronic device. In some implementations, the image capture device includes a frame-based camera, an event camera (e.g., dynamic vision sensor), a RGB camera, RGB-D cameras, depth sensors, motion sensors, acceleration sensors, orientation sensors, or combinations thereof.

In some implementations, a parallax 3D photo includes at least one frame of image data with corresponding depth information. The 3D parallax photo will appear three-dimensional from a limited range of viewpoints because of the corresponding depth information.

In some implementations, a 1-to-1 scale 3D photo includes at least image data, corresponding depth data, and additional information that provides actual scale (e.g., actual size) for at least some content of the 3D photo. In one implementation, one or more additional sensors on the image capture device are used to determine actual size for some content of the 3D photo. In some implementations, additional sensor(s) may detect an actual distance to content in images used to create the 3D photo. Accordingly, an actual size can be determined from the relative size of content in the images and the actual distance of the content from the image capture device. Alternatively, some sensors or image capture devices can provide meta-data to identify actual size of content in captured images used to create the 1-to-1 scale 3D photos. For example, an image capture device may include an intrinsic scale that allows the size information to be added to captured images.

In some implementations, 3D panoramic photos are created by capturing a plurality of images and depth data while the image capture device is moving (e.g., scanning in a single direction). In some implementations, the image capture device for 3D panoramic photos has additional sensors that capture its movement during the panoramic data capture session used to create the 3D panoramic photo. In some implementations, the plurality of images, depth data, and translation or rotation of the image capture device during the capture makes the 3D panoramic photo viewable in 3D for a limited range of viewpoints.

In some implementations, the 3D photos are multi-view 3D reconstruction photos. In some implementations, the multi-view 3D photo includes a plurality of image capture devices taking photos (e.g., image and depth data) of the same subject (e.g., overlapping content or features) from different angles at the same time or at approximately the same time. In one implementation, the multi-view 3D reconstruction photo implements a wedding scenario where lots of different individuals (e.g., using image capture devices) take pictures of a subject (e.g., cutting the wedding cake) at the same time from different distances and angles. Similarly, the different individuals may also take pictures of a subject (e.g., first kiss, first dance, best man toast, maid of honor toast, etc.) at approximately the same time from different distances and angles (e.g., poses). By identifying common features (e.g., overlapping content) in the plurality of photos in such wedding scenario multi-view reconstructions, a pose (e.g., position and orientation) of each image capture device can be determined and combined with the corresponding sensor data (e.g., image, depth, or movement data), and the corresponding sensor data from all (or a plurality of) the individual image capture devices is used to create the multi-view 3D reconstruction photo.

Alternatively, in some implementations, the multi-view 3D reconstruction photo is generated by a single image capture device. In such single image capture device multi-view 3D reconstructions, multiple images are taken of a single scene or subject from slightly different poses. For example, a person takes 10 slightly different pictures of a friend standing outside next to a tree before being satisfied with 1 of the 10 pictures. In this case, common features in the overlapping 10 pictures can be used to create a single 3D photo because of the differences in poses of the plurality of 10 pictures. In some single image capture device multi-view 3D reconstructions, movement of the single image capture device is also used in the multi-view 3D reconstruction photos.

In some implementations, for any type of 3D photo, the image capture device or additional sensors can concurrently or at about the same time capture lighting information at the time of 3D photo creation. For example, from the image capture process for the 3D photo specular highlights can be detected in at least some of the images and used to determine lighting of that physical environment. In some implementations, shadows from the plurality of images used to create the 3D scenes can provide lighting information of that physical environment. Alternatively, meta-data about lighting conditions may be recorded in addition to the data captured by the image capture device. For example, time of day and location information (e.g., outside at 3 o'clock on a specific date in a city in a state) can be used to determine lighting information of that physical environment. In some implementations, the image capture device includes additional sensor(s) such as ambient light sensors white balance sensors to concurrently or at about the same time capture lighting conditions.

In some implementations, for any type of 3D photo, the image capture device or additional sensors are used to determine a spatial relationship of the 3D photo to a positional reference or a subject/cutout of the 3D photo to the positional reference. In some implementations, the spatial relationship of the 3D photo to the positional reference (e.g., when created) is used to orient or pose the 3D photo in the XR environment (e.g., using a corresponding positional reference) for later viewing. For example, the actual size or spatial relationship of the 3D photo to a ground plane of the physical environment (e.g., the surface on which the subject of the 3D photo appears to be standing, a floor of a room) may be determined when the 3D photo is created, and then the corresponding size or spatial relationship is mimicked with respect to the ground plane (e.g., floor of an office, football field, or similar surface on which the subject of the 3D photo appears to be standing) in the XR environment. Thus, in some implementations, the ground plane alignment between the 3D photo subject in the physical environment during capture can be replicated for the rendered 3D photo in the XR environment during viewing. In some implementations, the ground plane is at 90 degrees to a picture plane or a flat 2D surface on which a 2D/3D image is drawn or projected in perspective. In another example, a person is leaning against a wall of a room when captured as the subject in a 3D photo, and then the leaning spatial relationship is mimicked with respect to a tree in a field (e.g., wall of an office, or similar surface against which the person of the 3D photo may lean) in the XR environment. Thus, in some implementations, the spatial relationship of the 3D photo to a positional reference in the physical environment during capture can be replicated for the rendered 3D photo in the XR environment during viewing.

In some implementations, for any type of 3D photo, only certain portions of the 3D photo are extracted and placed or used as the 3D photo in the XR environment. For example, when the subject is a person in an office behind a desk and chairs, the surrounding furniture in the office would not change much during a capture session by an image capture device for a 3D photo. Accordingly, in some implementations, a "cutout" of the person behind the desk can be extracted and used as the 3D photo cutout in the XR environment. In some implementations, the 3D cutout can have any three-dimensional shape (e.g., a sphere, an ovoid, a box, or the like) or size. In some implementations, the three-dimensional shape of the 3D cutout is based on context or semantic segmentation. In some implementations, the three-dimensional shape of the 3D cutout is based on movement of the image capture device during image capture for the 3D photo. In some implementations, lighting conditions (e.g., light source or shadows) in the XR environment are used to render the 3D photo cutout.

In some implementations, 3D photos are created from image and depth data captured in a physical environment in conventional ways. In some implementations, the created 3D photo has a limited range of 3D viewpoints (e.g., 3D viewing area). For example, when a 3D photo is created from images captured while facing a front of a can of soda, there will be limited information about the back of the can of soda in the 3D photo. Accordingly, as a viewpoint of the 3D photo of the can of soda in an XR environment moves from a viewpoint directly facing the front of the 3D photo of the can of soda, there will be increasing numbers or percentages of missing pixels in the view of the 3D photo of the can of soda.

In some implementations, various techniques are used to present or render 3D photos in an XR environment. In some implementations, a presentation mode is used to present or render 3D photos in an XR environment based on a viewing position of a viewing electronic device relative to a placement pose of the 3D photo in the XR environment. In some implementations, the presentation mode is based on point of view (POV) limitations or POV limitations and distance. In some implementations, the presentation mode includes 3D, 2D, blurry, or not at all. In some implementations, the presentation mode is determined by detecting the amount or percentage of valid pixels for the view of the 3D photo from the viewing position and comparing that against criteria or thresholds.

In some implementations, the 3D photo is depicted on or inside virtual objects in the XR environment. In some implementations, the 3D photo is depicted on or inside representations of physical objects in the XR environment. In some implementations, the presentation mode of the 3D photo may be altered when depicted on or inside virtual objects or representations of physical objects in the XR environment.

In some implementations, the 3D photo is treated as a portal into the scene of the 3D photo. In other words, the portal showing the 3D photo can include a 2D plane within the XR environment that will show the scene of the 3D photo in 3D when looked into by the user. In some examples, the portal showing the 3D photo will show the scene of the 3D photo in 3D while the viewpoint into the portal is within a valid viewing area, but will transition to show a 2D representation of the 3D scene of the 3D photo when the viewpoint is outside the valid viewing area to prevent the user from being able to see the missing data of objects in the 3D photo.

Figure 4:
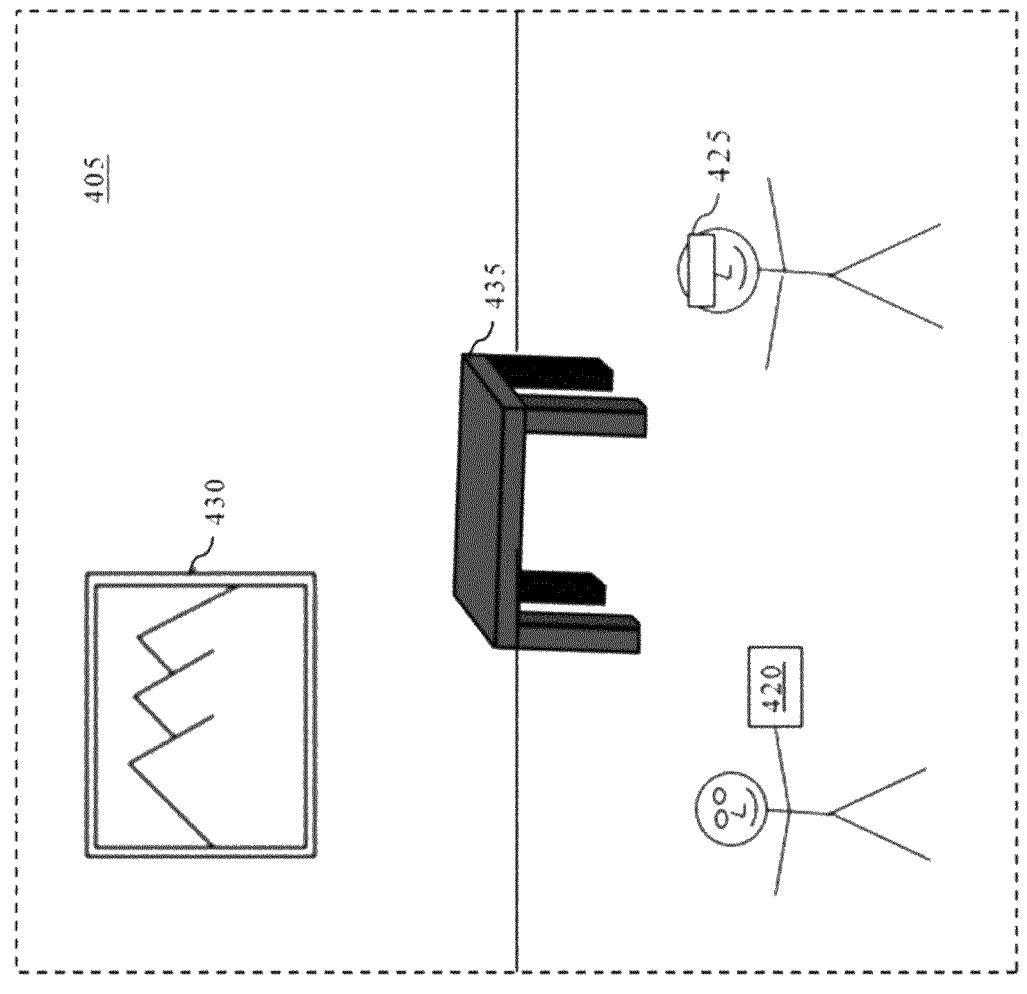
FIG. 4 is a block diagram showing an example environment.

Referring to FIG. 4, a physical environment 405 includes a first electronic device 420 being used by a first user and a second electronic device 425 being used by a second user. In this example, the environment 405 is a room that includes picture 430 and a table 435. The two devices 420, 425 can operate alone or interact with additional devices not shown to capture images of the environment, detect or track objects in those images, or to present XR content based on the images and the detected/tracked objects. Each of the two devices 420, 425 may communicate wirelessly or via a wired connection with a separate controller (not shown) to perform one or more of these functions. Similarly, each of the two devices 420, 425 may store information useful for the XR environment or may communicate with a separate device such as a server or other computing device that stores this information.

In some implementations, a device, such as device 425, is a head-mounted device (HMD) such as XR glasses that are worn by the second user. In some implementations, a device, such as the first device 420 is a handheld electronic device (e.g., a smartphone or a tablet) configured to present the XR environment to the first user. The first device 420 and the second device 425 are each configured to use images or other real world information detected based on a camera(s) or other sensor(s) to provide the XR environment.

In some implementations, the first or second device 420, 425 enable the user to change the viewpoint or otherwise modify or interact with the XR environment. In some implementations, the first or second device 420, 425 are configured to receive user input that interacts with displayed XR content. For example, a virtual object such as a 3D representation of a real world person or object, or informational displays each with interactive commands may be presented in the XR content. A user may reposition the virtual object or informational displays relative to the depicted real objects or interact with the interactive commands by providing user input on or otherwise using the respective device.

Figure 5:
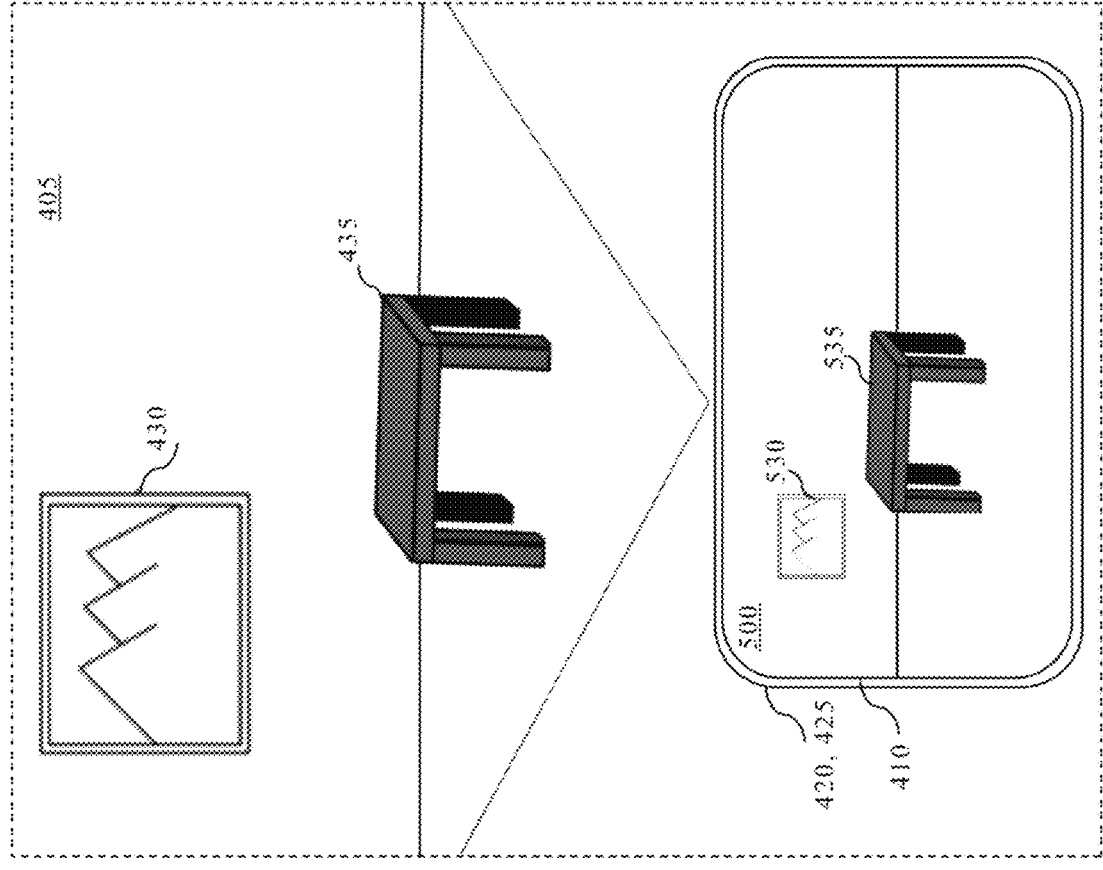
FIG. 5 is a block diagram showing a mobile device capturing a frame of a sequence of frames in the environment of FIG. 4 in accordance with some implementations.

FIG. 5 is a block diagram of the first or second device 420, 425 displaying an XR environment 500 based on the physical environment 405 of FIG. 4 in a display 410 in accordance with some implementations. The XR environment 500 may be generated from a frame of a sequence of frames captured by the first or second device 420, 425, for example, when executing an application in the physical environment 405. As shown in FIG. 5, the first or second device 420, 425 displays XR environment 500 including a depiction 530 of the picture 430 and a depiction 535 of the table 435. In some implementations, the XR environment 500 is shared by the first device 420 and the second device 425.

FIG. 6A-8 are diagrams that show example 3D photos presented in an XR environment in accordance with some implementations. As shown in FIGS. 6A-8, example 3D photos can be any type of 3D photo or cutouts therefrom.

Figure 6A:
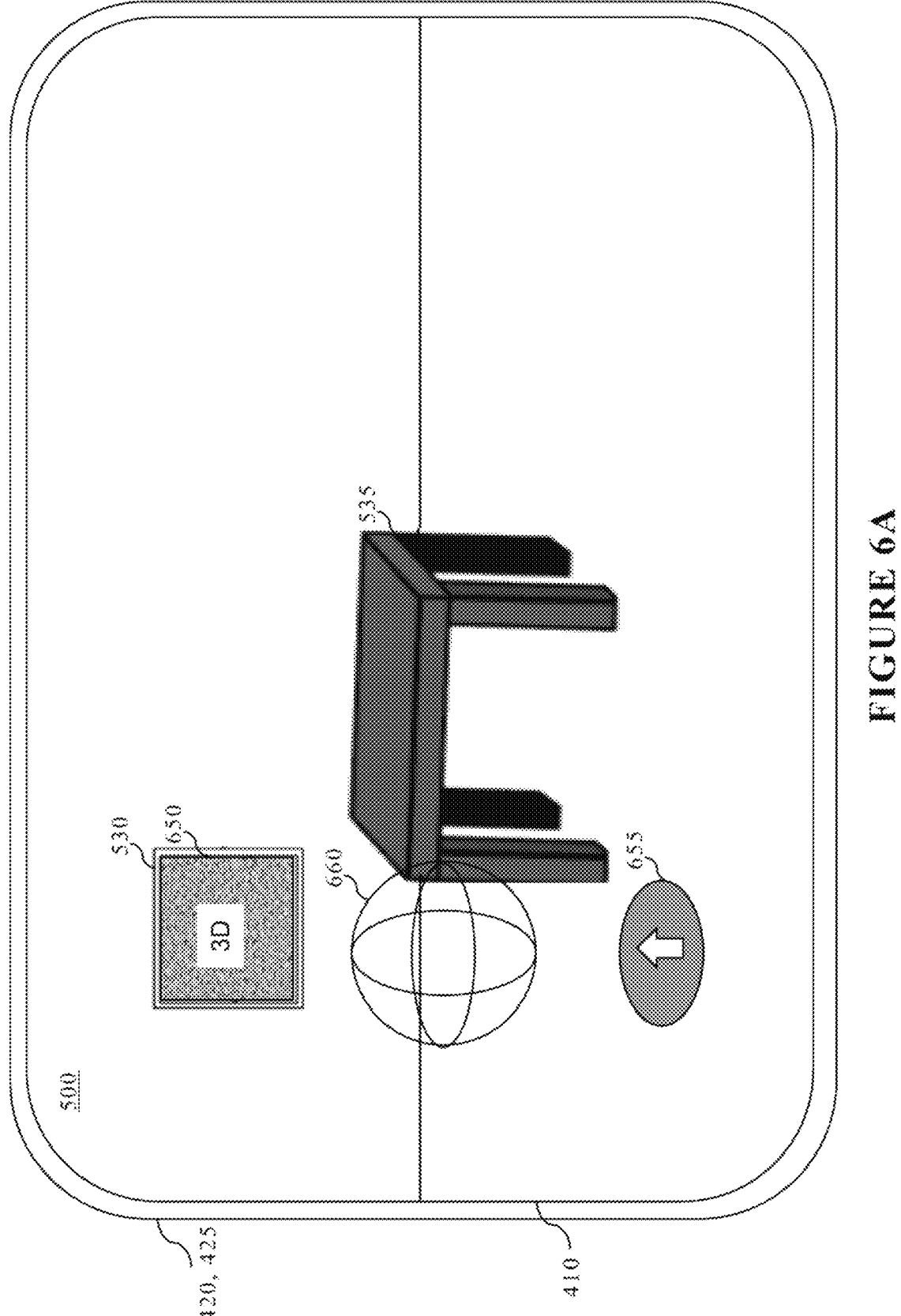
FIG. 6A-8 are diagrams that show example 3D photos presented in an XR environment in accordance with some implementations.
Figure 6B:
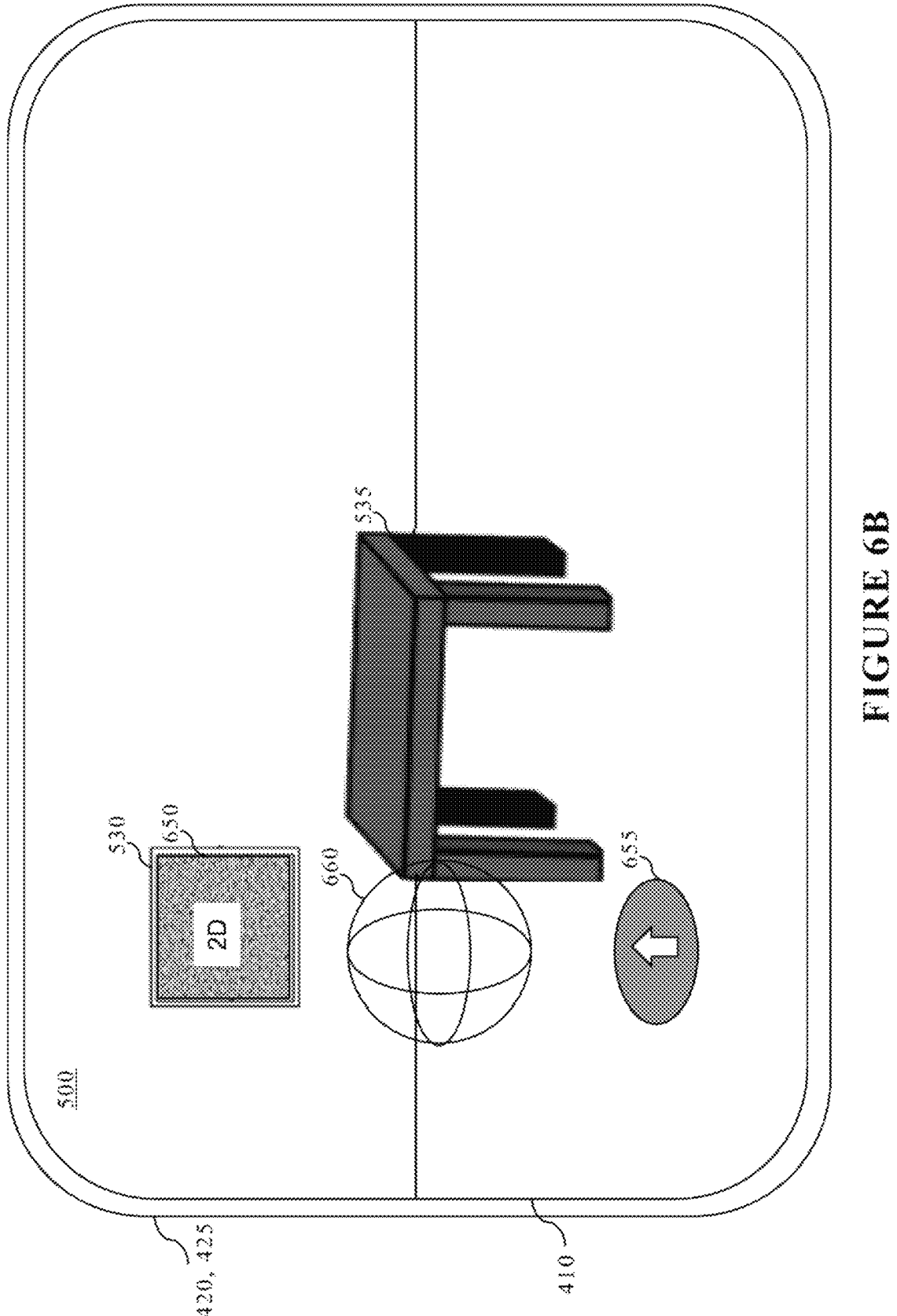

As shown in FIGS. 6A-6B, a 3D photo 650 is presented in the XR environment 500 on the depiction 530 of the picture 430. In some implementations, an indication 655 that the 3D photo 650 is in the XR environment 500 is provided. As shown in FIG. 6A, when a viewing electronic device is within a viewing area 660, a presentation mode of the 3D photo 650 to the viewing electronic device is a 3D presentation mode. For example, as the viewing electronic device moves within viewing area 660, the environment depicted by 3D photo 650 will be presented by the viewing electronic device such that it responds like a typical 3D environment viewed from different perspectives (e.g., with parallax). As shown in FIG. 6B, when the viewing electronic device is outside the viewing area 660 in the XR environment 500, the presentation mode of the 3D photo 650 to the viewing electronic device is "2D". For example, as the viewing electronic device moves outside of viewing area 660, the environment depicted by 3D photo 650 will be presented by the viewing electronic device such that it does not respond like a typical 3D environment viewed from different perspectives (e.g., without parallax) and will instead by presented as a flat 2D image.

In some examples, the location and size of viewing area 660 can be selected such that the viewing electronic device can satisfy a viewing criteria or present an amount or percentage of valid pixels of 3D photo 650 while inside of viewing area 660. In some examples, the location and size of viewing area 660 can depend on the capture location(s) of an image capture device during a capture session used to create the 3D photo and the position and orientation of the 3D photo within the XR environment. For example, the capture location(s) of the image capture device during a capture session used to create the 3D photo relative to one or more captured objects can be used to determine the relative offset between the 3D photo and the viewing area 660 since the image capture device was able to obtain valid pixel data for the 3D photo from that perspective.

In some examples, an indication of viewing area 660 is presented to the user. In other examples, no indication of viewing area 660 is presented to the user.

In some examples, lights or shadows within 3D photo 650 can affect the presentation of XR environment 500, lights or shadows within XR environment 500 can affect the presentation of 3D photo 650, or both. For example, if 3D photo 650 contains a bright red light, some of that red light can be projected onto portions of XR environment 500 as if a red light source were positioned at the location of 3D photo 650. This can be done to make 3D photo 650 appear as if it is actually within XR environment 500. In some examples, the lighting or shadowing affect can only be applied when a size of the 3D photo 650 in the XR environment 500 is greater than a threshold or when an intensity or other characteristic of the light or shadow of the 3D photo 650 is greater than a threshold. Similarly, in some examples, the lighting or shadowing affect can only be applied to 3D photo 650 when a size of the light source or shadow in the XR environment 500 is greater than a threshold or when an intensity or other characteristic of the light or shadow of the XR environment 500 is greater than a threshold.

Figure 7:
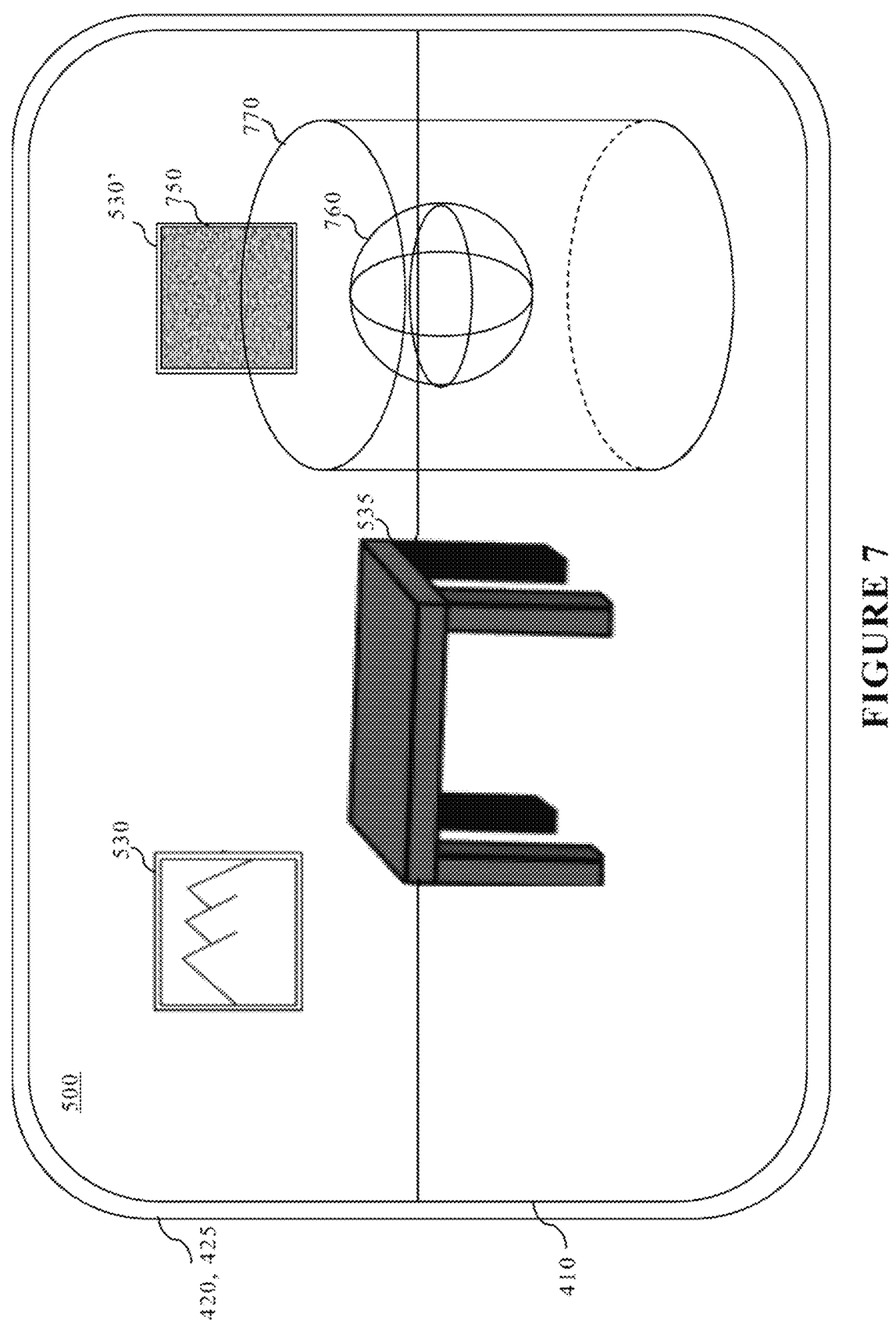

As shown in FIG. 7, a 3D photo 750 is presented in the XR environment 500 in a virtual picture frame 530'. As shown in FIG. 7, when a viewing electronic device is within a first viewing area 760, a presentation mode of the 3D photo 750 to the viewing electronic device is a 3D presentation mode. In some implementations, when the viewing electronic device is outside the first viewing area 760 but inside a second viewing area 770 in the XR environment 500, the presentation mode of the 3D photo 750 to the viewing electronic device is blurry. In some examples, the blurry presentation mode can include blurring all of 3D photo 750. In other examples, the blurry presentation mode can include presenting portions of 3D photo 750 with valid pixels without a blur effect, but presenting portions of 3D photo 750 where there are not valid pixels with a blur effect to hide the missing information. In some examples, a gradual transition between the blurred and unblurred portions of 3D photos can be applied. In some implementations, when the viewing electronic device is outside the second viewing area 770 in the XR environment 500, the presentation mode of the 3D photo 750 to the viewing electronic device is "do not show" and the viewing electronic device will present only the depiction 530 on the wall.

In some examples, viewing area 760 can be determined in the same or similar manner as described above with respect to viewing area 660. In some examples, an indication of viewing area 760 is presented to the user. In other examples, no indication of viewing area 760 is presented to the user.

In some examples, the location and size of viewing area 770 can be selected such that the viewing electronic device can satisfy a viewing criteria or present an amount or percentage of valid pixels of 3D photo 750 while inside of viewing area 770. The viewing criteria or percentage of valid pixels can be lower than that used to determine viewing area 760. In some examples, the location and size of viewing area 770 can depend on the capture location(s) of an image capture device during a capture session used to create the 3D photo and the position and orientation of the 3D photo within the XR environment. For example, the capture location(s) of the image capture device during a capture session used to create the 3D photo relative to one or more captured objects can be used to determine the relative offset between the 3D photo and the viewing area 770 since the image capture device was able to obtain valid pixel data for the 3D photo from that perspective.

In some examples, an indication of viewing area 770 is presented to the user. In other examples, no indication of viewing area 770 is presented to the user.

In some examples, lights or shadows within 3D photo 750 can affect the presentation of XR environment 500, lights or shadows within XR environment 500 can affect the presentation of 3D photo 750, or both in a manner similar or identical to that described above with respect to 3D photo 650.

Figure 8:

As shown in FIG. 8, a 3D photo 850 is presented in the XR environment 500 within a virtual object 830. In some implementations, an indication 855 that the 3D photo 850 is in the XR environment 500 is provided. In some implementations, the virtual object 830 is opaque. In FIG. 8, a presentation mode of the 3D photo 850 is a 3D presentation mode. In some implementations, the 3D photo 850 is placed on a bottom surface of a recess 830. Accordingly, based on dimensions (e.g., a shape, a depth and angles of sidewalls) of the recess 835 in the virtual object 830, a viewing area of the 3D photo 850 (e.g., by viewing electronic devices) is limited in the XR environment 500. In other words, when a viewing electronic device is outside a valid viewing area of the 3D photo 850, the 3D photo 850 is occluded by the virtual object 830. As a result, in some examples, no viewing area (similar to viewing area 660, 760, or 770) is determined or presented to the user.

In some examples, lights or shadows within 3D photo 850 can affect the presentation of XR environment 500, lights or shadows within XR environment 500 can affect the presentation of 3D photo 850, or both in a manner similar or identical to that described above with respect to 3D photo 650.

FIG. 9 is a flowchart illustrating an exemplary method of presenting a 3D photo in an XR environment according to some implementations. In some implementations, the 3D photo is an incomplete 3D representation because a significant amount of views would be incomplete from at least some viewpoints. In some implementations, the 3D photo is created based on one or more images captured by an image capture device. In some implementations, the method 900 is performed by an electronic device (e.g., controller 110 or electronic device 120 of FIGS. 1-3). The method 900 can be performed at a mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 obtains a three-dimensional (3D) photo including an incomplete 3D representation created based on one or more images captured by an image capture device. In some implementations, 3D photos include parallax 3D photos (e.g., 2D image with depth), 1-to-1 scale 3D photos, multi-view 3D reconstruction photos (e.g., wedding scenario or single device takes multiple slightly different pictures of the same scene), or 3D panoramic photos. In some implementations, the 3D photo is incomplete because a significant amount of the views would be incomplete from at least some viewpoints. For example, when viewed from in front and 5 feet away, a 3D photo may include enough data to provide 99% of pixels of the view with values, but when viewed from a 45° side angle and 10 feet away, the 3D photo may include only enough data to provide 65% of the pixels of the view with values. In some implementations, 3D photos may be created based on at least one image and additional sensor data (e.g., depth or motion data), based on image and depth data and pixel locations determined by triangulation (e.g., using multiple photos from the same or multiple users at about the same time), or multiple photos from a panorama-type photo capture.

At block 920, the method 900 determines a viewing position of the device relative to a placement position of the 3D photo. In some implementations, a spatial position (e.g., pose and orientation) of the 3D photo is determined for the 3D photo in the XR environment. For example, at block 920 the method 900 determines where the 3D photo will be placed in the XR environment. Further, a spatial position (e.g., pose and orientation) of a viewing electronic device is known for the XR environment. In some implementations, the viewing position (e.g., relative positioning) determines distance or direction from the viewing electronic device to the 3D photo.

At block 930, the method 900 determines a presentation mode for the 3D photo based on the viewing position. In some implementations, the 3D photo may be associated with one or more viewing areas (e.g., ideal viewing area, acceptable viewing area, invalid viewing area, etc.) and the presentation mode (e.g., 3D, blurry, 2D, not shown at all) is determined accordingly. In some implementations, the viewing areas may be based on the capture conditions during creation of the 3D photo (e.g., where the one or images used to create the 3D photo were captured from, how much movement there was, etc.). For example, a valid viewing sphere may be based on the capture locations of each image or an average capture location of an image capture device during a capture session used to create the 3D photo. In some implementations, the viewing position is within a valid viewing area for the 3D photo. In some implementations, the viewing position may be evaluated directly by determining the amount or percentage of valid pixels for the view of the 3D photo from the viewing position and comparing that against criteria or thresholds. For example, when greater than 95% of voxels have data then the 3D photo is rendered in 3D, when 70-95% of voxels have data then the 3D photo is rendered in 2D or blurred, and when less than 70% of voxels have data then the 3D photo is removed or not rendered at all. In some implementations, transitions between presentation modes of the 3D photo may be provided to the user of the viewing electronic device.

In some implementations, the viewing position of the device relative to the placement position of the 3D photo is determined to be in a first type viewing area or outside the first type viewing area based on movement of the image capture device during capture of the one or more images used to create the 3D photo. In some implementations, the viewing position in the first type viewing area uses a 3D presentation mode for the 3D photo. In some implementations, the viewing area is a 3D viewing area based on all device capture positions during creation of the 3D photo and a certain well-defined volume around those capture positions such as a sphere, ovoid, or box.

At block 940, the method 900 provides the 3D photo at the placement position based on the presentation mode in the XR environment. For example, the XR environment may be VR or MR. In some implementations, the electronic device is a head mounted device worn by a person.

In some implementations, the 3D photo is further modified, or the presentation mode is further modified based on a second viewing position of the device relative to the placement position of the 3D photo. In some implementations, the presentation mode includes a 3D presentation mode, a blurry presentation mode, a 2D presentation mode, or removed from the XR environment.

In some implementations, the lighting or shadowing of the 3D photo affects the XR environment because the size of the 3D photo in the XR environment is greater than a prescribed threshold. In some implementations, the lighting or the shadowing of the XR environment affects the 3D photo. In some implementations, the 3D photo is a 3D cutout of the incomplete 3D representation created based on the images captured by the image capture device. In some implementations, the 3D cutout is based on depth data, a 3D bounding region, or a 3D boundary. In some implementations, the 3D photo is a 3D cutout of the incomplete 3D representation created based on context or semantic data determined from images captured by the image capture device. In some implementations, the lighting or shadowing of the XR environment affects the 3D cutout.

In some implementations, the spatial relationship of the 3D photo to a positional reference in the physical environment during capture can be replicated for the rendered 3D photo in the XR environment during viewing. In some implementations, a capture relationship of the 3D photo to a capture ground plane is determined using one or more images captured by an image capture device during creation of the 3D photo. In some implementations, the ground plane capture relationship of the 3D photo is aligned to a ground plane of the XR environment during playback. For example, the actual size or spatial relationship of the 3D photo to a ground plane of the physical environment (e.g., the surface on which the subject of the 3D photo appears to be standing, a floor of a room) may be determined when the 3D photo is created, and then the corresponding size or spatial relationship is mimicked with respect to the ground plane (e.g., floor of an office, football field, or similar surface on which the subject of the 3D photo appears to be standing) in the XR environment.

In some implementations, missing pixels/voxels in a view of the 3D object from the viewing position are filled in based on smoothing techniques (e.g., image, depth, additional or related sensor data). In some implementations, missing pixels/voxels in a view of the 3D object from the viewing position are filled in based on nearby pixels/voxels with image values or depth values (e.g., nearby color values, average color, nearby depth values, or depth values over a confidence threshold). In some implementations, filling in missing pixels in the view of the 3D object provides an artistic treatment of gaps or missing pixels in the 3D photo. In some implementations, blurring missing pixels in the view of the 3D object provides an artistic treatment of gaps or missing pixels in the 3D photo. In some implementations, filling in missing pixels in the view of the 3D object is performed only when the missing pixels are under a preset threshold.

In some implementations, the method operates on an electronic device where processing of the XR environment occurs. In some implementations, the electronic device is the same electronic device that includes the image sensors (e.g., the HMD). In some implementations, the electronic device is a different electronic device that receives the data from the electronic device that has the image sensors (e.g. a server separate from the HMD). In some implementations, a single electronic device including a processor implements the XR environment (e.g., HMD). In some implementations, the XR environment is implemented by on more than one electronic device.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel. In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein are implemented on an electronic device including a processor.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
  at an electronic device having a processor:
    obtaining a three-dimensional (3D) photo comprising an incomplete 3D representation created based on one or more images captured by an image capture device, the incomplete 3D representation missing data for providing complete views from one or more viewpoints;
    determining a viewing position of the electronic device relative to a placement position of the 3D photo within an extended reality (XR) environment;
    determining a presentation mode for the 3D photo based on assessing how much of a view of the 3D object is valid from the viewing position, wherein assessing how much of the view of the 3D object is valid comprises:
      detecting an amount or percentage of valid pixels for the view of the 3D photo from the viewing position; and
      comparing the amount or percentage of valid pixels for the view against a threshold; and
    presenting the 3D photo at the placement position based on the presentation mode in the XR environment.

2. The method of claim 1, further comprising:

modifying the 3D photo or the presentation mode in response to the viewing position of the electronic device relative to a placement position of the 3D photo changing to a second viewing position.

3. The method of claim 2, wherein the second viewing position is determined to be in a first type of viewing area when at least a first threshold amount of pixels of a view of the 3D photo include image and depth values, a second type of viewing area when at least a second threshold amount and less than the first threshold amount pixels of the view of the 3D photo include the image and depth values, and a third type of viewing area otherwise.

4. The method of claim 2, wherein the second viewing position is determined to be in a first type viewing area or outside the first type viewing area based on movement of the image capture device during capture of the one or more images used to create the 3D photo.

5. The method of claim 1, wherein the presentation mode of the 3D photo is changed to a blurry presentation mode.

6. The method of claim 1, wherein the presentation mode of the 3D photo is changed to a 2D presentation mode.

7. The method of claim 1, wherein the presentation mode of the 3D photo is changed to an invisible presentation mode.

8. The method of claim 1, wherein lighting or shadowing of the 3D photo affects the XR environment or the lighting or the shadowing of the XR environment affects the 3D photo.

9. The method of claim 1, further comprising:

determining a capture relationship of the 3D photo to a ground plane using the one or more images captured by an image capture device; and matching the ground plane capture relationship of the 3D photo to a ground plane of the XR environment.

10. The method of claim 1, wherein the 3D photo is a 3D cutout of the incomplete 3D representation created based on the one or more images captured by the image capture device.

11. The method of claim 10, wherein the 3D cutout is based on depth data, a 3D bounding region, or a 3D boundary, and wherein lighting or shadowing of the XR environment affects the 3D cutout.

12. The method of claim 1, wherein missing pixels in a view of the 3D photo from the viewing position are filled in based on nearby pixels with image values or depth values.

13. The method of claim 1, wherein the 3D photo is created using at least 1 image and depth information.

14. The method of claim 1, wherein the 3D photo comprises scale information that is used to scale the 3D photo in the XR environment.

15. The method of claim 1, wherein the 3D photo is created using a plurality of images from a single electronic device, wherein the plurality of images is from a panoramic type of single capture event.

16. The method of claim 1, wherein the 3D photo is created using a plurality of images from a plurality of different electronic devices, wherein the plurality of images each include at least a portion of a physical object in a physical environment.

17. The method of claim 1, wherein the 3D photo is created using a plurality of images from a single electronic device, wherein the plurality of images are from a plurality of different capture events that each include at least a portion of a physical object in a physical environment.

18. The method of claim 1, wherein the 3D photo is displayed within or on a virtual object in the XR environment.

19. The method of claim 1, wherein assessing how much of the view of the 3D object is valid comprises:

detecting the amount of valid pixels for the view of the 3D photo from the viewing position; and comparing the amount of valid pixels for the view against a threshold.

20. The method of claim 1, wherein assessing how much of the view of the 3D object is valid comprises:

detecting the percentage of valid pixels for the view of the 3D photo from the viewing position; and comparing the percentage of valid pixels for the view against a threshold.

21. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining a three-dimensional (3D) photo comprising an incomplete 3D representation created based on one or more images captured by an image capture device, the incomplete 3D representation missing data for providing complete views from one or more viewpoints;

determining a viewing position of the electronic device relative to a placement position of the 3D photo within an extended reality (XR) environment;

determining a presentation mode for the 3D photo based on assessing how much of a view of the 3D object is valid from the viewing position, wherein assessing how much of the view of the 3D object is valid comprises:

detecting an amount or percentage of valid pixels for the view of the 3D photo from the viewing position; and comparing the amount or percentage of valid pixels for the view against a threshold; and presenting the 3D photo at the placement position based on the presentation mode in the XR environment.

22. A non-transitory computer-readable storage medium storing instructions executable via a processor to perform operations comprising:

obtaining a three-dimensional (3D) photo comprising an incomplete 3D representation created based on one or more images captured by an image capture device, the incomplete 3D representation missing data for providing complete views from one or more viewpoints;

determining a viewing position of the electronic device relative to a placement position of the 3D photo within an extended reality (XR) environment;

determining a presentation mode for the 3D photo based on assessing how much of a view of the 3D object is valid from the viewing position, wherein assessing how much of the view of the 3D object is valid comprises:

detecting an amount or percentage of valid pixels for the view of the 3D photo from the viewing position; and comparing the amount or percentage of valid pixels for the view against a threshold; and presenting the 3D photo at the placement position based on the presentation mode in the XR environment.

\* \* \* \* \*